United States Patent
Lee

(10) Patent No.: US 12,430,927 B2
(45) Date of Patent: Sep. 30, 2025

(54) METHOD AND SYSTEM FOR RECOGNIZING SURROUNDING DRIVING ENVIRONMENT BASED ON SVM ORIGINAL IMAGE

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 526 days.

(21) Appl. No.: 17/658,425

(22) Filed: Apr. 7, 2022

(65) Prior Publication Data

US 2022/0335732 A1  Oct. 20, 2022

(30) Foreign Application Priority Data

Apr. 19, 2021 (KR) ......................... 10-2021-0050738

(51) Int. Cl.
*G06V 20/56* (2022.01)
*G06T 7/10* (2017.01)
*G06T 7/70* (2017.01)

(52) U.S. Cl.
CPC .............. *G06V 20/588* (2022.01); *G06T 7/10* (2017.01); *G06T 7/70* (2017.01); *G06T 2207/20084* (2013.01); *G06T 2207/30256* (2013.01)

(58) Field of Classification Search
CPC ............ G06V 20/588; G06T 7/10; G06T 7/70
See application file for complete search history.

(56) References Cited

U.S. PATENT DOCUMENTS

| | | | | |
|---|---|---|---|---|
| 10,275,667 | B1* | 4/2019 | Kim ....................... | G06F 18/217 |
| 10,423,860 | B1* | 9/2019 | Kim ....................... | H04N 7/188 |
| 12,187,278 | B1* | 1/2025 | Rafieisakhaei ......... | G08G 1/052 |
| 2018/0046865 | A1* | 2/2018 | Chen ....................... | G06F 18/22 |
| 2018/0137375 | A1* | 5/2018 | Takemura .............. | H04N 23/75 |
| 2018/0208175 | A1* | 7/2018 | Zhang ................... | B60W 10/06 |

(Continued)

FOREIGN PATENT DOCUMENTS

| | | | | |
|---|---|---|---|---|
| CN | 110287884 A | * | 9/2019 | ......... G06K 9/00798 |
| CN | 112580424 A | * | 3/2021 | ......... G06K 9/00798 |

(Continued)

OTHER PUBLICATIONS

English Language Abstract of KR 10-1115076 published Mar. 13, 2012.

(Continued)

*Primary Examiner* — Ming Y Hon
(74) *Attorney, Agent, or Firm* — DLA PIPER LLP US

(57) ABSTRACT

A method of recognizing a surrounding driving environment based on a surround view mirror (SVM) original image. The method includes: acquiring an image captured by an SVM camera; semantically segmenting a pixel corresponding to a vehicle (hereinafter, a vehicle pixel) and a pixel corresponding to a lane (hereinafter, a lane pixel) from the image; post-processing the semantically segmented vehicle pixel and lane pixel to extract object information including adjacent lane information and adjacent vehicle information from the image; and converting the extracted object information into a physical position and transmitting the physical position to a driving controller.

14 Claims, 11 Drawing Sheets

(56) References Cited

U.S. PATENT DOCUMENTS

| | | | | |
|---|---|---|---|---|
| 2019/0095731 | A1* | 3/2019 | Vernaza | G06F 18/214 |
| 2019/0174060 | A1* | 6/2019 | Oba | H04N 23/90 |
| 2020/0026960 | A1* | 1/2020 | Park | G05D 1/0088 |
| 2020/0034231 | A1* | 1/2020 | Ishay | G06V 20/56 |
| 2020/0058107 | A1* | 2/2020 | Kim | G06T 5/73 |
| 2020/0288056 | A1* | 9/2020 | Jeong | H04N 23/55 |
| 2020/0294215 | A1* | 9/2020 | Yun | G06T 3/12 |
| 2021/0182596 | A1* | 6/2021 | Adams | G06V 20/588 |
| 2021/0183025 | A1* | 6/2021 | Watson | G06T 7/0012 |
| 2021/0276549 | A1* | 9/2021 | Schroeder | B60W 30/12 |
| 2021/0295174 | A1* | 9/2021 | Zhang | G06N 3/082 |
| 2021/0303925 | A1* | 9/2021 | Hofmann | G06V 20/10 |
| 2022/0086423 | A1* | 3/2022 | Yautz | G02B 27/0006 |
| 2022/0284623 | A1* | 9/2022 | Kumar | B60W 60/0015 |
| 2022/0292846 | A1* | 9/2022 | Tamura | G06V 10/82 |
| 2022/0398850 | A1* | 12/2022 | Ogawa | G08G 1/0175 |
| 2024/0239368 | A1* | 7/2024 | Du Toit | G06V 10/82 |
| 2025/0029353 | A1* | 1/2025 | Skapura | G16H 30/40 |

FOREIGN PATENT DOCUMENTS

| | | |
|---|---|---|
| KR | 10-1115076 | 3/2012 |
| KR | 10-1721442 | 3/2017 |

OTHER PUBLICATIONS

English Language Abstract of KR 10-1721442 published Mar. 30, 2017.

\* cited by examiner

METHOD AND SYSTEM FOR RECOGNIZING SURROUNDING DRIVING ENVIRONMENT BASED ON SVM ORIGINAL IMAGE

CROSS-REFERENCE TO RELATED APPLICATION

This application claims priority to and the benefit of Korean Patent Application No. 10-2021-0050738, filed on Apr. 19, 2021, the disclosure of which is incorporated herein by reference in its entirety.

BACKGROUND

Field of the Invention

The present invention relates to a method and system for recognizing a surrounding driving environment based on a surround view mirror (SVM) original image.

Discussion of Related Art

FIGS. 1A and 1B are view for describing a limitation in recognizing a vehicle and a lane using a front camera of the vehicle.

A general vehicle front camera is designed to have a narrow angle of view to recognize a distant vehicle. However, in this case, as shown in FIGS. 1A and 1B, a lane may be obscured by a preceding vehicle (FIG. 1A) or an adjacent vehicle changing lanes may not be detected (FIG. 1B).

To this end, a technology (an advanced driver assistance system virtual platform (ADAS VP) controller)) for recognizing a surrounding driving environment using a surround view monitoring (SVM) camera while driving has been proposed.

In the method of recognizing the surrounding driving environment using the SVM camera while driving, an image is converted into a top-view (a bird's eye view) to extract object information. In the top-view image, the position and physical distance of each pixel are matched one-to-one, so that the position of an object on the image may be easily converted into physical coordinates. However, since the top-view converts a three-dimensional (3D) space into a two-dimensional (2D) space and provides the 2D space, height information disappears, and thus image distortion is so severe that it is difficult for people to recognize the object.

RELATED ART DOCUMENTS PATENT DOCUMENT

Korean Laid-open Patent Publication No. 10-2019-0000599 (Jul. 13, 2020)

SUMMARY OF THE INVENTION

The present invention is directed to providing a method and system for recognizing a surrounding driving environment based on an SVM original image, capable of recognizing a surrounding driving environment while driving using an SVM original image to overcome a limitation in top-view image processing.

The technical objectives of the present invention are not limited to the above, and other objectives may become apparent to those of ordinary skill in the art based on the following description.

According to the first aspect of the present invention, there is provided a method of recognizing a surrounding driving environment based on a surround view mirror (SVM) original image, the method including: acquiring an image captured by an SVM camera; semantically segmenting a pixel corresponding to a vehicle (hereinafter, a vehicle pixel) and a pixel corresponding to a lane (hereinafter, a lane pixel) from the image; post-processing the semantically segmented vehicle pixel and lane pixel to extract object information including adjacent lane information and adjacent vehicle information from the image; and converting the extracted object information into a physical position and transmitting the physical position to a driving controller.

According to the second aspect of the present invention, there is provided a system for recognizing a surrounding driving environment based on a surround view mirror (SVM) original image, the system including: an SVM camera configured to capture an image around a vehicle; a communication module configured to receive the image captured by the SVM camera; a memory in which a program for recognizing a surrounding driving environment on the basis of the captured image is stored; and a processor configured to execute the program stored in the memory to: semantically segment a pixel corresponding to a vehicle (hereinafter, a vehicle pixel) and a pixel corresponding to a lane (hereinafter, a lane pixel) from the image; post-process the semantically segmented vehicle pixel and lane pixel to extract object information including adjacent lane information and adjacent vehicle information from the image; and convert the extracted object information into a physical position and transmit the physical position to a driving controller.

According to another aspect of the present invention, there is provided a computer program that executes the method of recognizing a surrounding driving environment based on an SVM original image in combination with a computer, which is hardware and is stored in a computer recording medium.

Other specific details of the present invention are included in the specification and the accompanying drawings

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
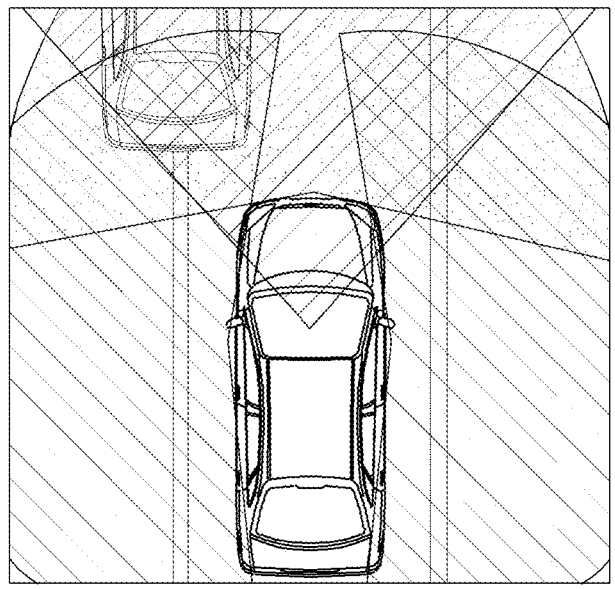
FIGS. 1A and 1B are view for describing a limitation in recognizing a vehicle and a lane using a front camera of the vehicle.
Figure 1B:
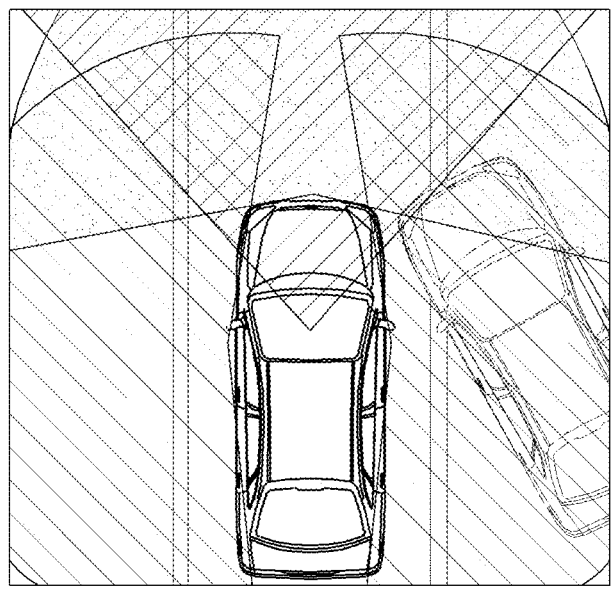

Hereinafter, the advantages and features of the present invention and ways of achieving them will become readily apparent with reference to the following embodiments described in detail in conjunction with the accompanying drawings. However, the present invention is not limited to such embodiments and may be embodied in various forms. The embodiments to be described below are provided only to make the disclosure of the present invention complete and assist those of ordinary skill in the art in fully understanding the scope of the present invention, and the scope of the present invention is defined only by the appended claims.

Terms used herein are used for aiding in the description and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof. In connection with assigning reference numerals to elements in the drawings, the same reference numerals are used for designating the same elements throughout the specification, and the term "and/or" includes any one or combinations of the associated listed items. It should be understood that, although the terms "first," "second," etc. may be used herein to describe various elements, these elements are not limited by these terms. These terms are only used for distinguishing one element from another. For example, a first element could be termed a second element without departing from the scope of the present invention.

Unless otherwise defined, all terms (including technical and scientific terms) used herein have the same meaning as commonly understood by one of ordinary skill in the art to which this invention belongs. It should be further understood that terms, such as those defined in commonly used dictionaries, should not be interpreted in an idealized or overly formal sense unless expressly specifically defined herein.

Figure 2:
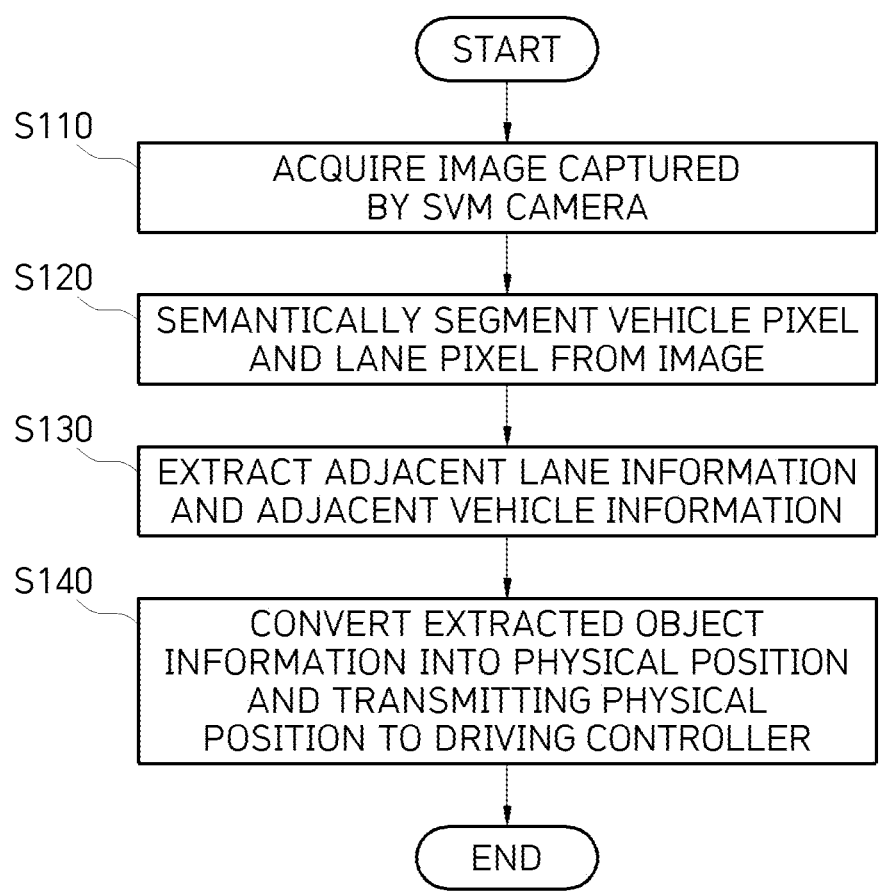
FIG. 2 is a flowchart showing a method of recognizing a surrounding driving environment according to an embodiment of the present invention.

FIG. 2 is a flowchart of a method of recognizing a surrounding driving environment according to an embodiment of the present invention.

Meanwhile, each operation shown in FIG. 2 may be understood to be performed by an apparatus 100 for recognizing a surrounding driving environment to be described below, but the present invention is not limited thereto.

A method of recognizing a surrounding driving environment based on a surround view mirror (SVM) original image (hereinafter, a surrounding driving environment recognition method) according to an embodiment of the present invention includes acquiring an image captured by an SVM camera (S110), semantically segmenting a pixel corresponding to a vehicle (hereinafter, a vehicle pixel) and a pixel corresponding to a lane (hereinafter, a lane pixel) from the image (S120), post-processing the semantically segmented vehicle pixel and lane pixel to extract object information including adjacent lane information and adjacent vehicle information from the image (S130), and converting the extracted object information into a physical position and transmitting the physical position to a driving controller (S140).

Figure 3:
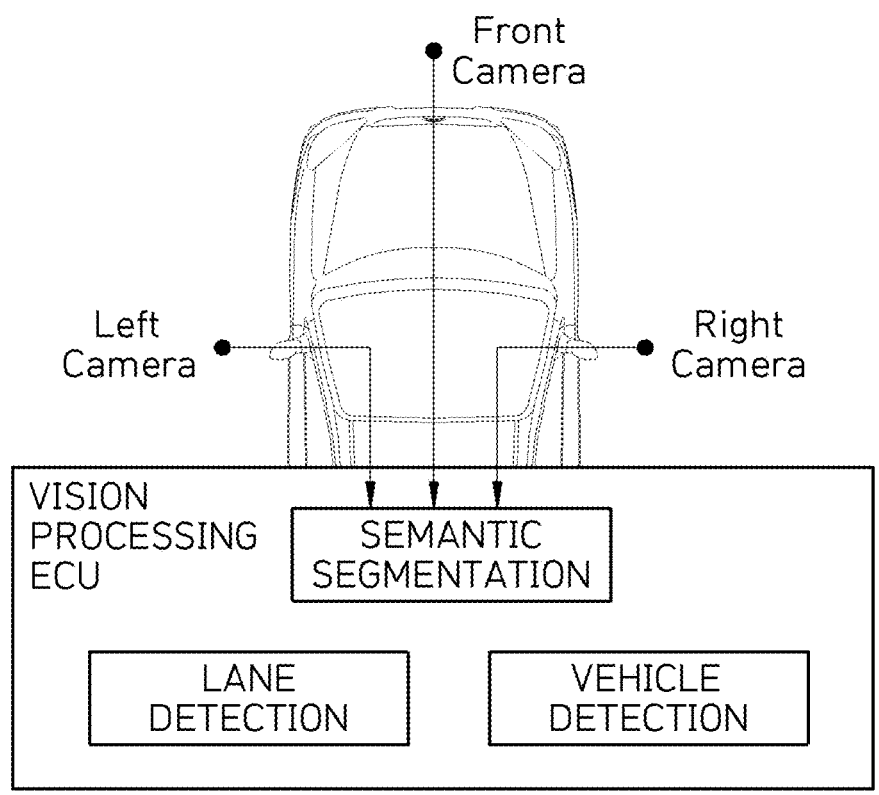
FIG. 3 is a schematic diagram illustrating an example of recognizing a surrounding driving environment based on an SVM camera image.

FIG. 3 is a schematic diagram illustrating an example of recognizing a surrounding driving environment based on an SVM camera image.

First, in order to resolve the limitations of a front camera in that an adjacent vehicle changes lanes and a lane is obscured, an image captured by the SVM camera is received as shown in FIG. 3 (S110). In this case, the SVM camera may include a front camera and left and right side cameras of a vehicle.

In this case, since the embodiment of the present invention uses the original image of the SVM camera, pre-processing, such as lens distortion correction, rectification, view conversion, and the like, is not used.

In one embodiment, the SVM camera may be configured to include a fisheye lens.

Next, a vehicle pixel corresponding to a vehicle and a lane pixel corresponding to a lane are semantically segmented from the image (S120).

Figure 4:
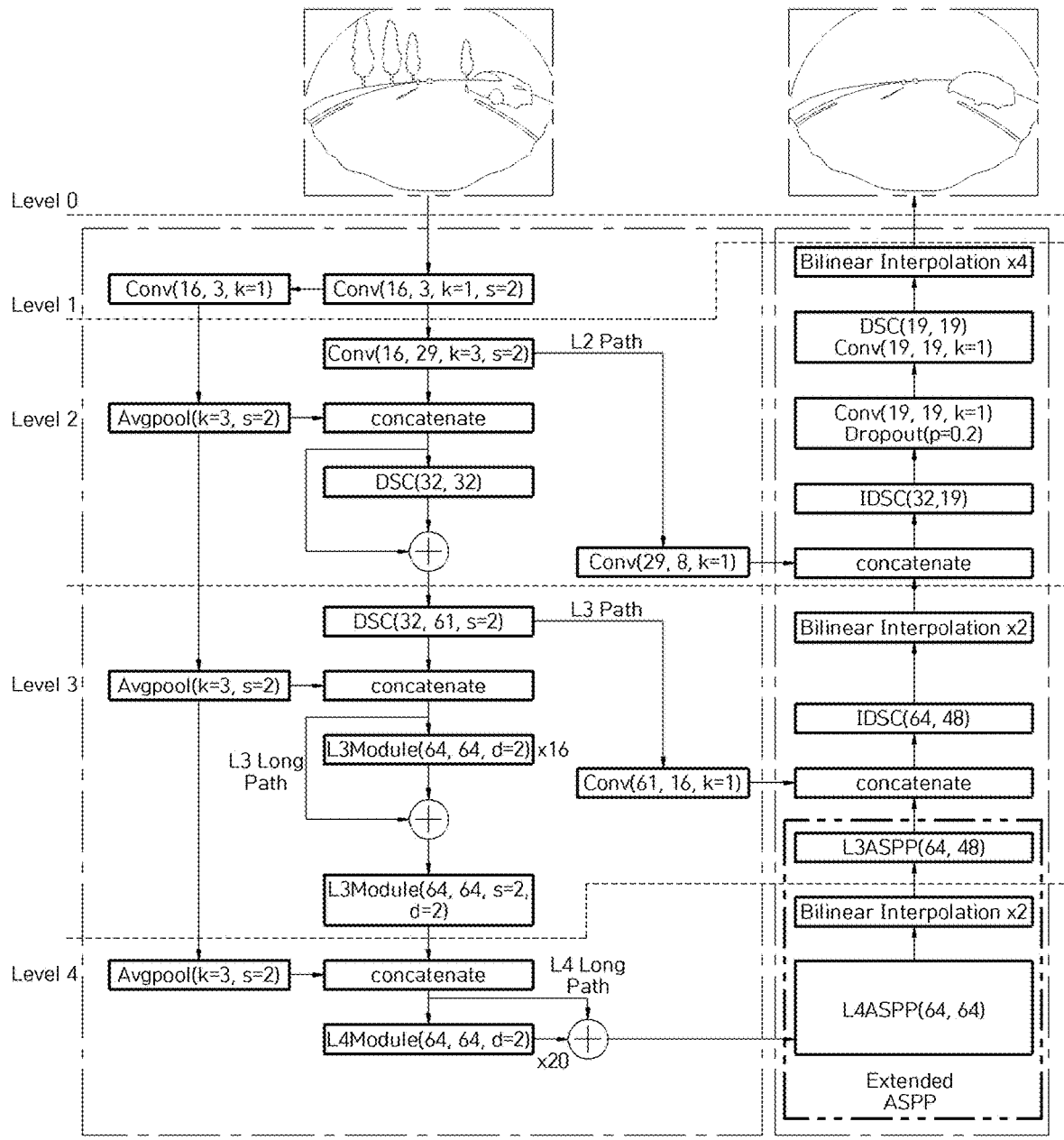
FIG. 4 is a diagram for describing a semantic segmentation network applied to an embodiment of the present invention.

FIG. 4 is a diagram for describing a semantic segmentation network applied to an embodiment of the present invention.

In one embodiment, the present invention may semantically segment a vehicle pixel and a lane pixel based on a matrix multiplication accelerator network (MMANet)-based semantic segmentation network configured to be optimized in advance for a matrix multiplication for semantic segmentation.

Specifically, in order to reduce the cost of the implementation controller, the present invention is provided to operate on a low-cost digital signal processor (DSP), e.g., Ti, TDA4V-MID, rather than on a high-cost graphics processing unit (GPU).

A general deep learning-based semantic segmentation network is optimized for operation on a GPU or ARM. However, since the embodiment of the present invention uses a DSP including only a low-cost matrix multiplier as hardware, each pixel of an image is classified using a MMANet optimized for matrix multiplication as shown in FIG. 4. In this case, items to be classified are not limited to vehicle pixels and lane pixels, and roads, the sky, road surface markings, etc. may also be classified and other uncategorized items may also be semantically segmented.

Next, the semantically segmented vehicle pixel and lane pixel are subject to post-processing to extract object information including adjacent lane information and adjacent vehicle information from the image (S130). Then, the extracted object information is converted into a physical position and the physical position is transmitted to a driving controller (S140).

Hereinafter, each process of extracting and transmitting adjacent lane information and adjacent vehicle information will be described in detail with reference to FIGS. 5 to 7.

Figure 5:
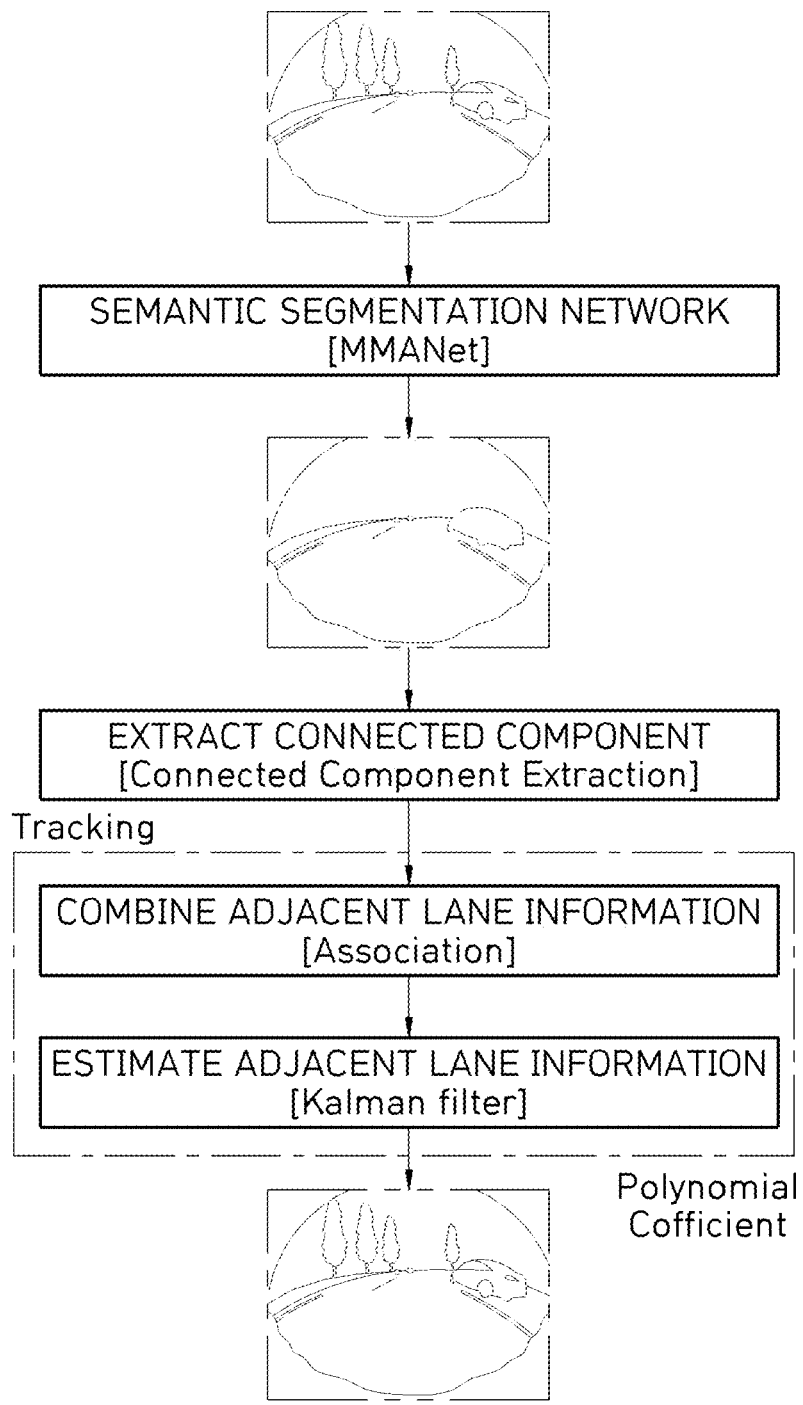
FIG. 5 is a diagram for describing a process of extracting adjacent lane information according to an embodiment of the present invention.

FIG. 5 is a diagram for describing a process of extracting adjacent lane information according to an embodiment of the present invention.

First, a pixel, classified as a lane, among neighboring pixel values in a predetermined direction based on the semantically segmented lane pixel (e.g., eight directions based on a specific pixel), is indexed as a same connected component.

In the method, a pixel, classified as a lane, among eight-direction neighboring pixel values of a specific pixel classified as a lane, is indexed as the same connected component. In this case, according to the embodiment of the present invention, in order to remove point noise generated in the semantic segmentation process, a specific index of which the number of constituent pixels is less than a preset lane pixel threshold may be regarded as noise and removed. That is, even when a specific part is classified as a lane in the deep learning network output, the specific part may be an actual road area, which has been classified as a lane due to noise. To this end, according to the embodiment of the present invention, when the number of pixels constituting a specific index is smaller than a threshold value of a lane pixel threshold value that is a constant predetermined in a development process, the specific index may be determined as noise and removed.

Next, image coordinates of the indexed lane pixel are subjected to polynomial regression analysis to estimate adjacent lane information.

The SVM camera is mounted in the ground direction to detect a nearby area. Therefore, in most cases, a first-order polynomial simulation may be performed using a linear regression method. That is, image coordinates of the indexed lane pixel may be simulated with a first-order polynomial to estimate a first pixel position estimate value.

Then, a mean square error (MSE) value of a difference between a position of the indexed lane pixel and a position according to the first pixel position estimate is calculated, and when the difference is less than or equal to a preset threshold value of the first-order polynomial, the first pixel position estimate may be estimated as adjacent lane information.

Even when lanes on an actual road have a complex shape, a similar appearance of the lane may be represented through approximation using third-order polynomial regression. However, in this case, a straight line containing noise may be represented as a curve. In the embodiment of the present invention, first, simulation (regression) is performed with a straight line (the first-order polynomial regression method), and when the simulation is not good, the order may be gradually increased up to a third-order polynomial.

Meanwhile, the threshold value (a constant determined in the development process) applied to each polynomial may be determined as the maximum error value of a simulated curve and an actual pixel that can be accommodated by the system. Therefore, when less than or equal to a threshold value, to which each maximum error value is applied, a polynomial of the corresponding order is used for the simulation without increasing the order.

On the other hand, when the MSE value of the difference between the position of the indexed lane pixel and the position according to the first pixel position estimate value is greater than the preset threshold value, a second-order polynomial may be used.

In this case, the image coordinates of the indexed lane pixel may be simulated using the second-order polynomial to calculate a second pixel position estimate, and when a MSE value of a difference between the position of the indexed lane pixel and a position according to the second pixel position estimate is less than or equal to a preset threshold value of the second-order polynomial, the second pixel position estimate may be estimated as adjacent lane information.

Similarly, when the MSE value of the difference between the position of the indexed lane pixel and the position according to the second pixel position estimate is greater than the preset threshold value of the second-order polynomial, the image coordinates of the indexed lane pixel may be simulated using a third-order polynomial to calculate a third pixel position estimate, and the third pixel position estimate may be estimated as adjacent lane information.

In this case, the reason for not using the third-order polynomial in the simulation in the beginning is to prevent a model estimated by the higher-order polynomial regression method having a high degree of freedom from overfitting due to noise generated during the semantic segmentation process. That is, polynomials may be sequentially used starting from the lowest order so that the generalization performance may be further increased. On the other hand, since a distant site in the SVM image is assigned a small number of pixels, the maximum order of the regression method is limited to the third order.

Meanwhile, according to an embodiment of the present invention, when a distance between first adjacent lane information and second adjacent lane information among pieces of the estimated adjacent lane information is less than a preset lane threshold value, the first adjacent lane information and the second adjacent lane information may be combined to be the same lane. That is, since an equation of a lane is applied to the entire image area, when the distance between two lanes is less than a lane threshold, the two lanes may be combined to be the same lane. Here, the lane threshold is a constant predetermined in the development process. When the same straight lane in an image is disconnected in the middle, two straight lines are represented, and when the distance between the two straight lines is less than the lane threshold, the two straight lines may be regarded as the same straight lane.

In this case, an index of a nearby lane has a large number of constituent pixels, and since a lane simulated using a larger number of pixels is closer to an accurate lane model, the first adjacent lane information and second adjacent lane information may be combined such that one of indexes of the first adjacent lane information and second adjacent lane information which has a smaller number of pixels is changed to the other index which has a larger number of pixels.

Thereafter, each coefficient of the third-order polynomial may be tracked using a Kalman filter, so that the influence of an undetected area may be minimized.

Here, the coefficient of the higher-order term of a lane simulated by the first-order polynomial or the second-order polynomial is 0.

Thereafter, the tracked coordinates are converted into a physical position using lens distortion and calibration values, and the adjacent lane information is transmitted to the driving controller.

Figure 6:
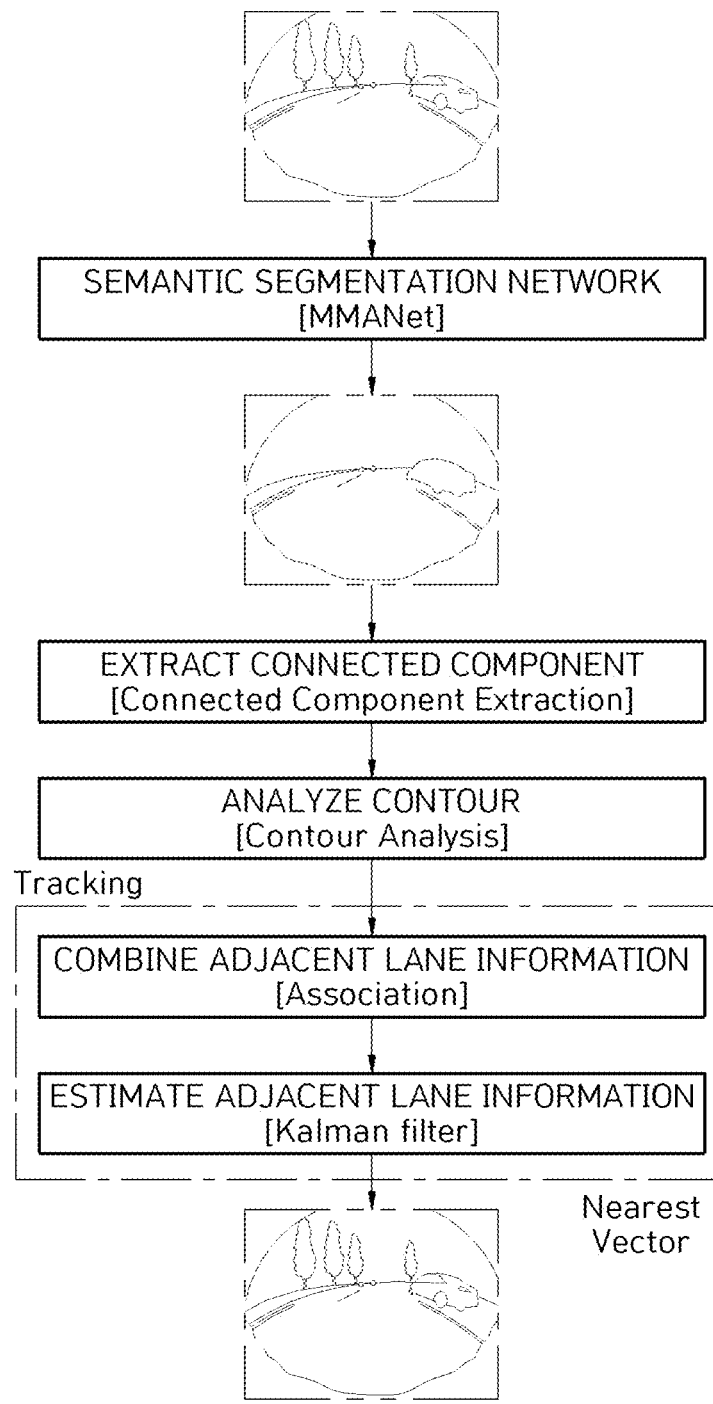
FIG. 6 is a diagram for describing a process of extracting adjacent vehicle information according to an embodiment of the present invention.
Figure 7:
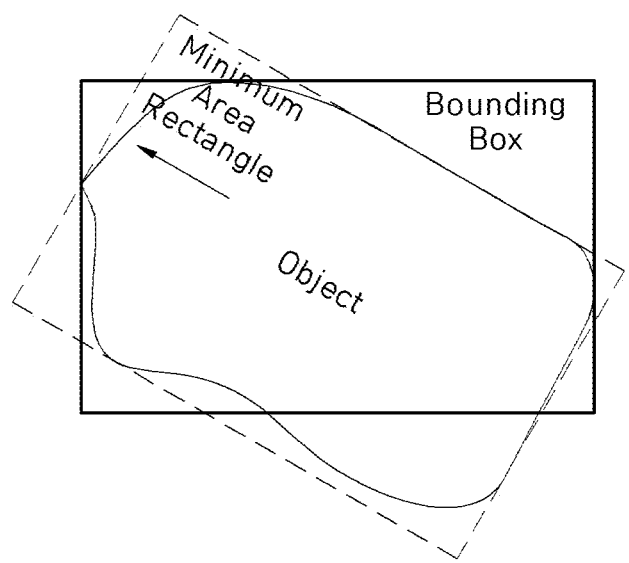
FIG. 7 is a diagram for describing a minimum area rectangle.

FIG. 6 is a diagram for describing a process of extracting adjacent vehicle information according to an embodiment of the present invention. FIG. 7 is a diagram for describing a minimum area rectangle.

First, a pixel, classified as a vehicle, among neighboring pixel values in a predetermined direction based on the semantically segmented vehicle pixel (e.g., eight directions based on a specific pixel) is indexed as the same connected component.

In the method, a pixel, classified as a vehicle, among eight-direction neighboring values of a specific pixel classified as a vehicle is indexed as the same connected component. In this case, according to the embodiment of the present invention, in order to remove point noise generated in the semantic segmentation process, a specific index of which the number of constituent pixels is less than a preset vehicle pixel threshold may be regarded as noise and removed. That is, even when a specific part is classified as a vehicle in the deep learning network output, the specific part may be an actual road area, which has been classified as a vehicle due to noise. To this end, according to the embodiment of the present invention, when the number of pixels constituting a specific index is smaller than a threshold value of a vehicle pixel threshold value that is a constant predetermined in a development process, the specific index may be determined as noise and removed.

Next, a rectangle circumscribing a contour of the indexed vehicle pixel and having an area that is a minimum is calculated, and the minimum area rectangle may be estimated as adjacent vehicle information.

Specifically, a contour of the vehicle pixel constituted of each index is calculated and a rectangle having a minimum area and circumscribing the contour is obtained. In the method, as shown in FIG. 7, the pixel constituting the calculated contour is rotationally transformed to calculate rectangles having the maximum and minimum values in the image width direction and the maximum and minimum values in the image height direction, and a rectangle having a rotational transformation angle at which the area is the minimum is calculated as the minimum area rectangle.

Here, the reason for using the minimum area rectangle circumscribing the contour is that vehicles located on the left and right sides of an image of an SVM front camera are rotationally transformed in the direction of the vanishing point, and when a bounding box is used, the proportion of a part that is not a vehicle in the bounding box is greater than 25%. Accordingly, it is difficult to use the bounding box to express pixels constituting the corresponding vehicle. For this reason, the embodiment of the present invention represents a vehicle object using a minimum area rectangle including a rotation angle in a bounding box.

Meanwhile, when a plurality of pieces of adjacent vehicle information are estimated, a mean intersection over union (mIoU) value between minimum area rectangles of first adjacent vehicle information and second adjacent vehicle information is calculated, and when the calculated mIoU value is greater than or equal to a preset vehicle threshold value, the first adjacent vehicle information and the second adjacent vehicle information may be combined to be the same adjacent vehicle information. Accordingly, a minimum area rectangle of the combined adjacent vehicle information is recalculated. That is, when the same vehicle is classified into two groups by deep learning network noise, the two groups need to be combined to be one vehicle, and in this case, the mIoU may be calculated as a large value since rectangles constituting the groups overlap each other. Therefore, when the mIoU of two groups is greater than a vehicle threshold (a constant determined in advance in the development process), the two groups may be regarded as one vehicle and combined to be adjacent vehicle information.

Thereafter, the coordinates and the orientation angles of four points constituting the rectangle minimum area rectangle are tracked using the Kalman filter to minimize an undetected area. The tracked coordinates are converted into a physical position using lens distortion and calibration values, and the adjacent vehicle information is transmitted to the driving controller.

Meanwhile, in the above description, operations S110 to S140 may be further divided into a larger number of operations or combined into a smaller number of operations according to examples of implementation of the present invention. In addition, some of the operations may be omitted or may be executed in reverse order as needed. Parts omitted in the following description, which have been described above with reference to FIGS. 2 to 7, may be applied to the description of FIG. 8.

Hereinafter, a system 100 for recognizing a surrounding driving environment according to an embodiment of the present invention will be described with reference to FIG. 8.

Figure 8:
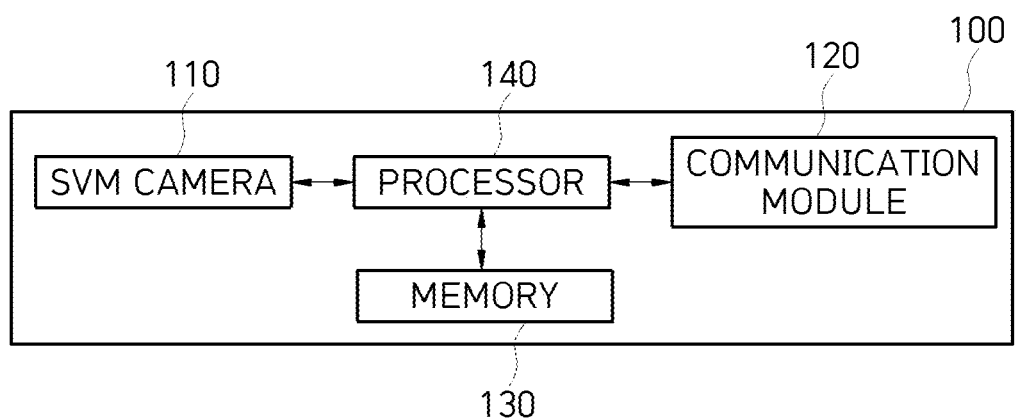
FIG. 8 is a diagram for describing a system 100 for recognizing a surrounding driving environment according to an embodiment of the present invention.

FIG. 8 is a diagram for describing a system 100 for recognizing a surrounding driving environment according to an embodiment of the present invention.

The system 100 for recognizing a surrounding driving environment according to an embodiment of the present invention includes an SVM camera 110, a communication module 120, a memory 130, and a processor 140.

The SVM camera 110 captures an image around a vehicle, and the communication module 120 receives the image captured by the SVM camera 110.

A program for recognizing a surrounding driving environment based on the captured image is stored in the memory 130, and the processor 140 executes the program stored in the memory 130.

The processor 140 executes the program stored in the memory 130 to semantically segment a vehicle pixel and a lane pixel from the image, post-process the semantically segmented vehicle pixel and lane pixel to extract object information including adjacent lane information and adjacent vehicle information from the image, and convert the extracted object information into a physical position and transmit the physical position to a driving controller.

Hereinafter, a test result of an embodiment of the present invention will be described with reference to FIGS. 9 to 11.

Figure 9A:
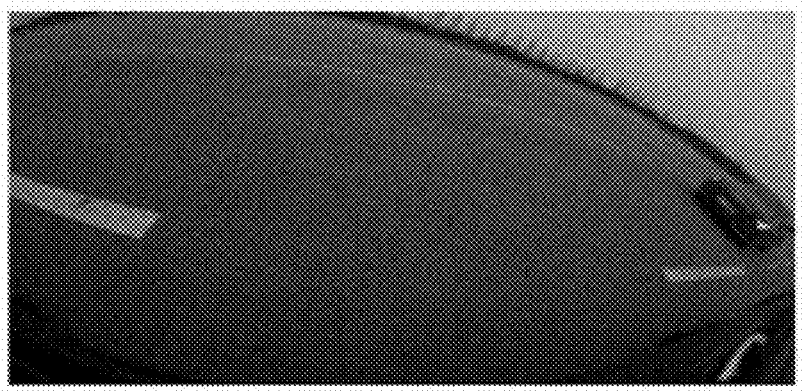
FIGS. 9A to 9C are diagrams for illustrating a result of semantic segmentation of an SVM side camera.
Figure 9B:
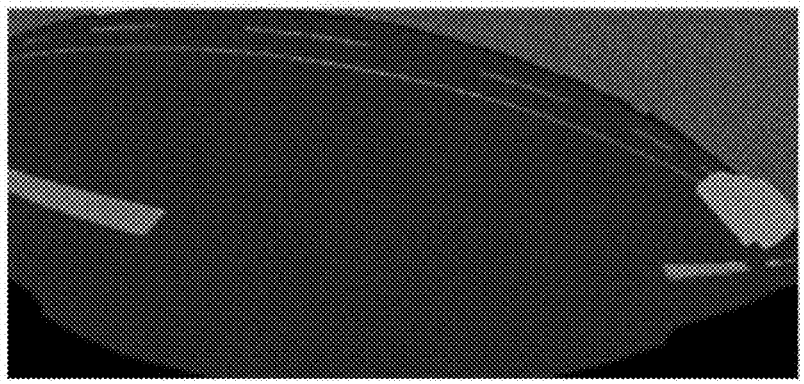
Figure 9C:
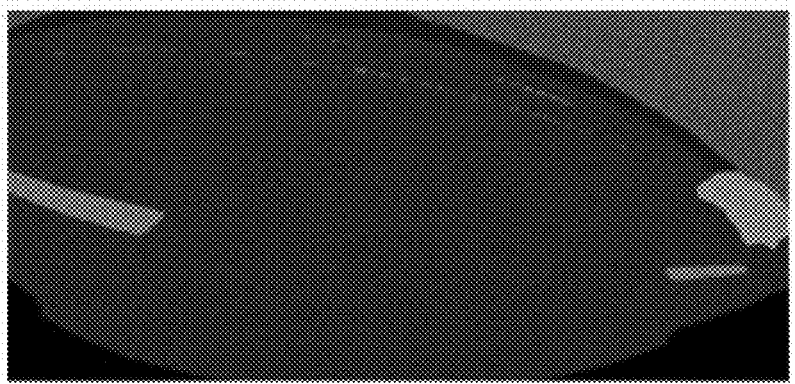
Figure 10A:
FIGS. 10A to 10C are diagrams for describing a result of semantic segmentation and object recognition of an SVM front camera.
Figure 10B:
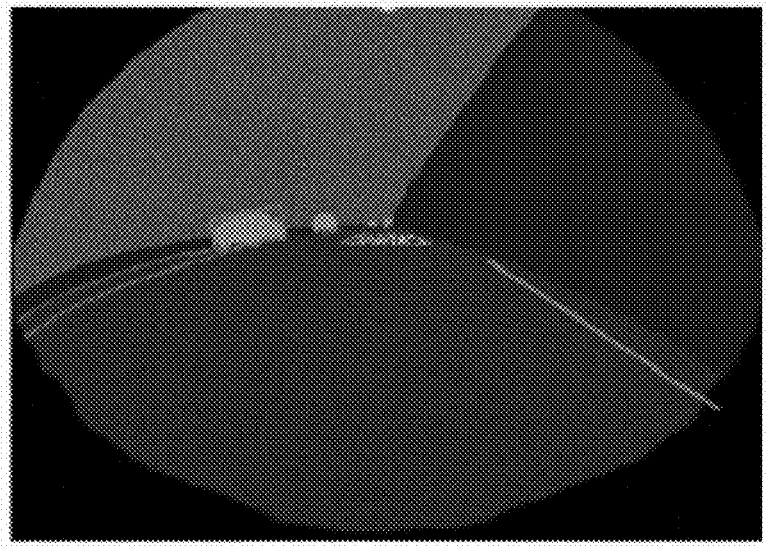
Figure 10C:
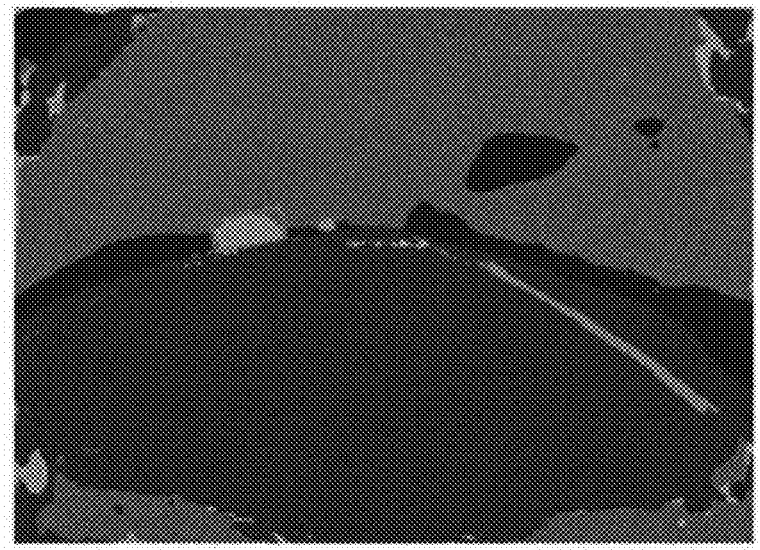
Figure 11A:
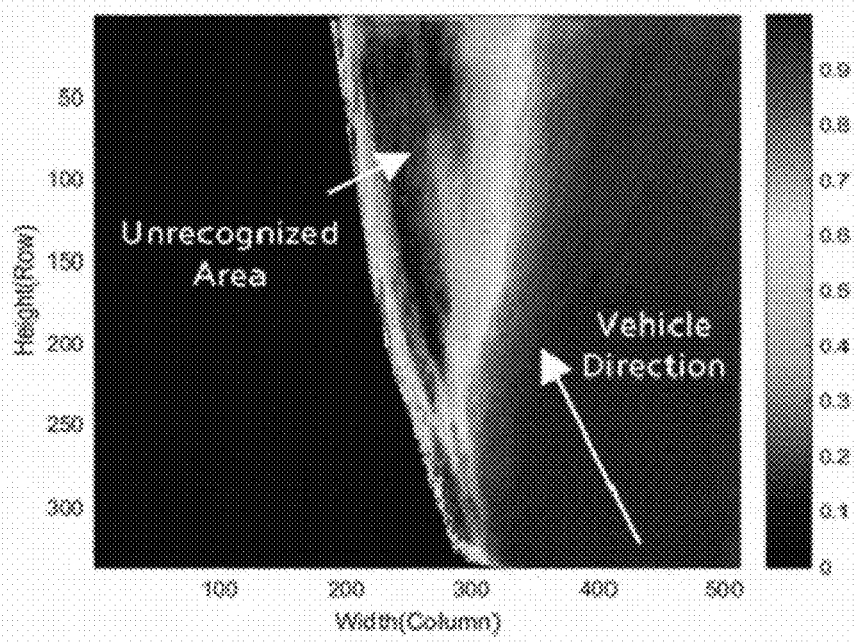
FIGS. 11A and 11B are diagrams illustrating a recall value for each pixel of a preceding vehicle in an adjacent lane change situation.
Figure 11B:
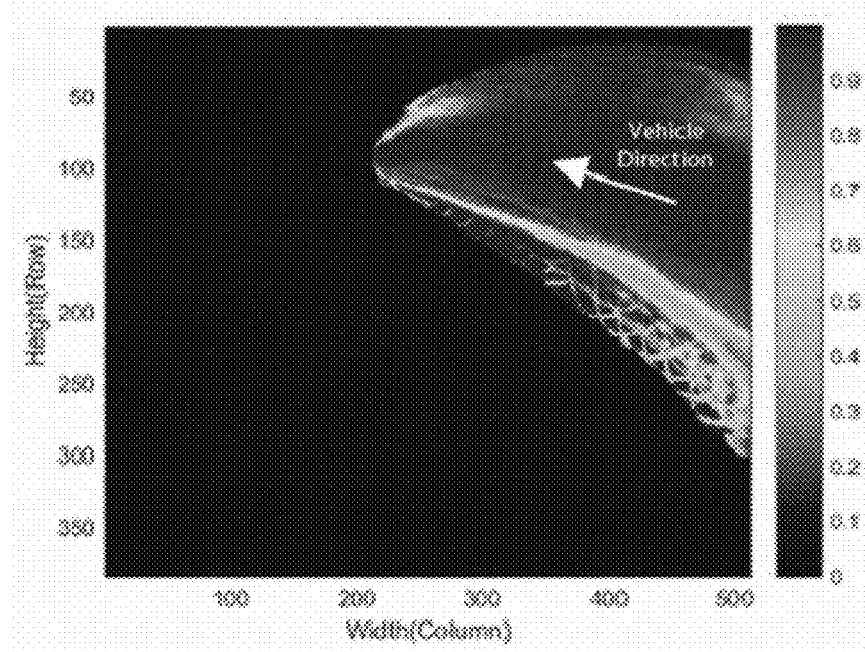

FIGS. 9A to 9C are diagrams illustrating a result of semantic segmentation of an SVM side camera. FIGS. 10A to 10C are diagrams for describing a result of semantic segmentation and object recognition of an SVM front camera. FIGS. 11A and 11B are diagrams illustrating a recall value for each pixel of a preceding vehicle in an adjacent lane change situation.

First, a semantic segmentation result of an SVM side camera is shown in FIGS. 9A to 9C. FIG. 9A shows an input image, FIG. 9B shows an answer key, and FIG. 9C shows an output result through a semantic segmentation network. It can be seen that as a result of the segmentation, both the vehicle and the lane are classified almost accurately.

Next, a semantic segmentation and object estimation result using an SVM front camera image is shown in FIGS. 10A to 10C. FIG. 10A shows an input image, FIG. 10B shows an answer key, and FIG. 10C shows an output result through a semantic segmentation network. Referring to the output result, it can be seen that the semantic segmentation and object estimation result is almost the same as a result estimated by a human. In this case, a black area on the answer key is a vehicle body, which is not a region of interest.

Meanwhile, it can be seen that, compared to when training a MMANet using a top-view, the lane and vehicle recognition performance of the proposed original image are increased by 15.2 mIoU and 16.3 mIoU, respectively, as shown in Table 1.

TABLE 1

| mIoU | Lane | Vehicle |
|---|---|---|
| Top View | 44.1 mIoU | 57.3 mIoU |
| Original View | 59.3 mIoU | 73.6 mIoU |

In addition, as shown in FIGS. 11A and 11B, in the top-view image, an adjacent vehicle changing lanes (a) may not be recognized, but in the original image according to the embodiment of the present invention, an adjacent vehicle changing lanes is normally recognized (b).

As described above, the embodiment of the present invention provides high recognition performance, so that the reliability of autonomous driving may be improved.

The method of recognizing a surrounding driving environment according to the embodiment of the present invention described above may be implemented as a program (or application) and stored in a medium in order to be executed in combination with a computer, which is hardware.

The program may include code coded in a computer language, such as C, C++, Java, another machine language, etc., that can be read by a processor (e.g., a central processing unit (CPU)) of a computer through a device interface of the computer in order for the computer to read the program and execute the methods implemented as the program. The code may include functional code that is related to a function that defines functions needed to execute the methods and may include execution procedure-related control code needed to cause the processor of the computer to execute the functions according to a predetermined procedure. In addition, the code may further include memory reference-related code indicating a location (an address) of an internal or external memory of the computer where additional information or media needed to cause the processor of the computer to execute the functions should be referenced. In addition, when the processor of the computer needs to communicate with any other computer or server, etc. at a remote site, to perform the above-described functions, the code may further include communication-related code such as how to communicate with any other computer or server at a remote site and what information or media should be transmitted or received during communication.

The storage medium is not a medium that stores data for a short period of time, such as a register, cache, memory, etc., but is a medium that stores data semi-permanently and can be read by a device. Specifically, examples of the storage medium include may include a read-only memory (ROM), a random-access memory (RAM), a compact disc (CD)-ROM, a magnetic tape, a floppy disk, an optical data storage device, etc., but the storage medium is not limited thereto. That is, the program may be stored in various recording media on various servers accessible by the computer or on various recording media on the computer of the user. In addition, the media may be distributed over computer systems connected through a network so that computer-readable code may be stored in a distributed manner.

The above description of the invention is for illustrative purposes, and a person having ordinary skill in the art should appreciate that other specific modifications can be easily made without departing from the technical spirit or essential features of the invention. Therefore, the above-described embodiments should be regarded as illustrative rather than limitative in all aspects. For example, components which have been described as being a single unit can be implemented in a distributed form, whereas components which have been described as being distributed can be implemented in a combined form.

In order to raise the level of autonomous driving, the weaknesses of the existing circular sensor needs to be supplemented. However, the method of using the top-view image of the SVM camera has low recognition performance due to severe distortion of a tall object.

As is apparent from the above, according to the above-described embodiment of the present invention, object distortion can be minimized while using an original image of the SVM camera, and the recognition performance of a deep learning algorithm that performs the same operation on the entire image can be maximized. Accordingly, even with limitations of a front camera and radar, highly reliable surrounding driving environment information can be provided, thereby realizing level 3 of autonomous driving in a situation, such as a highway and the like.

The effects of the present invention are not limited to those described above, and other effects not described above will be clearly understood by those skilled in the art from the above detailed description.

The scope of the present invention is not defined by the detailed description as set forth above but by the accompanying claims of the invention. It should also be understood that all changes or modifications derived from the definitions and scope of the claims and their equivalents fall within the scope of the invention.

What is claimed is:

1. A computer implemented method of recognizing a surrounding driving environment of a vehicle, the method comprising:
   acquiring multiple surround view monitor (SVM) original images around the vehicle comprising a left-side SVM original image captured by a left side SVM camera and a right-side SVM original image captured by a right side SVM camera;
   recognizing the surrounding driving environment of the vehicle by separately processing each of the left-side SVM original image and the right-side SVM original image, the separate processing for each of the respective SVM original images comprising:
      semantically segmenting a vehicle pixel corresponding to an adjacent vehicle and a lane pixel corresponding to a lane from the respective SVM original images;
      post-processing the semantically segmented vehicle pixel and the lane pixel to extract object information including adjacent lane information and adjacent vehicle information from the respective SVM original images, the post-processing comprising removing pixels having a specific index as noise when a number of the pixels is less than a preset vehicle pixel threshold; and
      converting the extracted object information from the respective SVM original images into a physical position and transmitting the physical position to a driving controller.

2. The method of claim 1, wherein the SVM camera is configured to include a fisheye lens.

3. The method of claim 1, wherein the semantical segmenting of the vehicle pixel and the lane pixel from the image comprises semantically segmenting the vehicle pixel and the lane pixel based on a matrix multiplication accelerator network (MMANet)-based semantic segmentation network configured in advance to be optimized for matrix multiplication.

4. The method of claim 1, wherein the post-processing of the semantically segmented vehicle pixel and lane pixel to extract the object information including the adjacent lane information and the adjacent vehicle information from the image comprises:
indexing a pixel, classified as a lane, among neighboring pixel values in a predetermined direction based on the lane pixel, as a same connected component; and
performing polynomial regression analysis on image coordinates of the indexed lane pixel to estimate the adjacent lane information.

5. The method of claim 4, wherein the performing of the polynomial regression analysis on the image coordinates of the indexed lane pixel to estimate the adjacent lane information comprises:
simulating the image coordinates of the indexed lane pixel using a first-order polynomial to calculate a first pixel position estimate; and
estimating the first pixel position estimate as the adjacent lane information when a mean square error (MSE) value of a difference between a position of the indexed lane pixel and a position according to the first pixel position estimate is less than or equal to a preset threshold value of the first-order polynomial.

6. The method of claim 5, wherein the performing of the polynomial regression analysis on the image coordinates of the indexed lane pixel to estimate the adjacent lane information comprises:
when the MSE value of the difference between the position of the indexed lane pixel and the position according to the first pixel position estimate is greater than the preset threshold value of the first-order polynomial,
simulating the image coordinates of the indexed lane pixel using a second-order polynomial to calculate a second pixel position estimate; and
estimating the second pixel position estimate as the adjacent lane information when a MSE value of a difference between the position of the indexed lane pixel and a position according to the second pixel position estimate is less than or equal to a preset threshold value of the second-order polynomial.

7. The method of claim 6, wherein the performing of the polynomial regression analysis on the image coordinates of the indexed lane pixel to estimate the adjacent lane information comprises:
simulating the image coordinates of the indexed lane pixel using a third-order polynomial to calculate a third pixel position estimate when the MSE value of the difference between the position of the indexed lane pixel and the position according to the second pixel position estimate is greater than the preset threshold value of the second-order polynomial; and
estimating the third pixel position estimate as the adjacent lane information.

8. The method of claim 7, further comprising:
tracking each coefficient of the third-order polynomial using a Kalman filter.

9. The method of claim 4, wherein the post-processing of the semantically segmented vehicle pixel and lane pixel to extract the object information including the adjacent lane information and the adjacent vehicle information from the image comprises:
combining the first adjacent lane information and the second adjacent lane information to be the same lane when a distance between first adjacent lane information and second adjacent lane information among pieces of the estimated adjacent lane information is less than a preset lane threshold value,
wherein the first adjacent lane information and second adjacent lane information are combined such that one of indexes of the first adjacent lane information and second adjacent lane information which has a smaller number of pixels is changed to another one of the indexes which has a larger number of pixels.

10. The method of claim 1, wherein the post-processing of the semantically segmented vehicle pixel and lane pixel to extract the object information including the adjacent lane information and the adjacent vehicle information from the image comprises:
indexing a pixel, classified as a vehicle, among neighboring pixel values in a predetermined direction based on the vehicle pixel as a same connected component;
calculating a rectangle circumscribing a contour of the indexed vehicle pixel and having an area that is a minimum; and
estimating the minimum area rectangle as the adjacent vehicle information.

11. The method of claim 10, wherein the calculating of the minimum area rectangle circumscribing the contour of the indexed vehicle pixel comprises:
rotationally transforming a pixel constituting the contour to calculate rectangles having a maximum value and a minimum value in an image width direction and a maximum value and a minimum value in an image height direction; and
calculating a rectangle having a rotational transformation angle at which the area is the minimum as the minimum area rectangle.

12. The method of claim 11, wherein the calculating of the minimum area rectangle circumscribing the contour of the indexed vehicle pixel comprises:
calculating a mean intersection over union (mIoU) value between minimum area rectangles of first adjacent vehicle information and second adjacent vehicle information among pieces of the estimated adjacent vehicle information;
combining the first adjacent vehicle information and the second adjacent vehicle information to be the same adjacent vehicle information when the calculated mIoU value is greater than or equal to a preset vehicle threshold value; and
recalculating a minimum area rectangle of the combined adjacent vehicle information.

13. The method of claim 11, further comprising:
tracking coordinates and orientation angles of four points constituting the minimum area rectangle using a Kalman filter.

14. A system for recognizing a surrounding driving environment of a vehicle, the system comprising:
a left-side surround view monitor (SVM) camera mounted to the vehicle, the left-side SVM camera configured to capture a left-side SVM original image around the vehicle;
a right-side SVM camera mounted to the vehicle, the right-side SVM camera configured to capture a right-side SVM original image around the vehicle;
a memory in which a program for recognizing the surrounding driving environment based on the captured SVM original image is stored; and
a processor configured to execute the program stored in the memory to recognize the surrounding driving environment of the vehicle by separately processing each of the left-side SVM original image and the right-side SVM original image, the separate processing for each of the respective SVM original images comprising:

semantically segment a vehicle pixel corresponding to a vehicle and a lane pixel corresponding to a lane from the respective SVM original images;

post-process the semantically segmented vehicle pixel and the lane pixel to extract object information including adjacent lane information and adjacent vehicle information from the respective SVM original images, the post-process comprising removing pixels having a specific index as noise when a number of the pixels is less than a preset vehicle pixel threshold; and convert the extracted object information from the respective SVM original images into a physical position and transmit the physical position to a driving controller.

\* \* \* \* \*